US011518665B2

(12) United States Patent
Linke et al.

(10) Patent No.: US 11,518,665 B2
(45) Date of Patent: Dec. 6, 2022

(54) METHOD AND DEVICE FOR FILLING CONTAINERS WITH CARBONIZED FILLING MATERIAL AND SUBSEQUENTLY CLOSING THE FILLED CONTAINERS

(71) Applicant: KHS GmbH, Dortmund (DE)

(72) Inventors: Michael Linke, Hamburg (DE); Rolf Baumgarte, Ahrensburg (DE); Michael Litzenberg, Börnsen (DE); Benjamin Jaiser, Hamburg (DE); Frank Berger, Barsbüttel (DE)

(73) Assignee: KHS GmbH, Dortmund (DE)

( * ) Notice: Subject to any disclaimer, the term of this patent is extended or adjusted under 35 U.S.C. 154(b) by 96 days.

(21) Appl. No.: 16/960,060

(22) PCT Filed: Apr. 8, 2019

(86) PCT No.: PCT/EP2019/058807
§ 371 (c)(1),
(2) Date: Jul. 3, 2020

(87) PCT Pub. No.: WO2019/197337
PCT Pub. Date: Oct. 17, 2019

(65) Prior Publication Data
US 2021/0053811 A1 Feb. 25, 2021

(30) Foreign Application Priority Data

Apr. 12, 2018 (DE) ..................... 10 2018 108 760.8

(51) Int. Cl.
*B67C 3/26* (2006.01)
*B29C 49/42* (2006.01)
(Continued)

(52) U.S. Cl.
CPC ............ *B67C 3/2614* (2013.01); *B29C 49/12* (2013.01); *B29C 49/4273* (2013.01);
(Continued)

(58) Field of Classification Search
CPC ... B29C 49/06; B29C 49/28; B29C 2049/465; B29C 2049/4652; B29C 2049/4655;
(Continued)

(56) References Cited

U.S. PATENT DOCUMENTS 2,695,743 A 11/1954 Wetherby-Williams
6,082,418 A 7/2000 Naecker et al.
(Continued)

FOREIGN PATENT DOCUMENTS

CA 2023652 A1 2/1991
CN 102152471 A 8/2011
(Continued)

OTHER PUBLICATIONS

International Search Report dated Jul. 11, 2019 filed in PCT/EP2019/058807.

*Primary Examiner* — Hemant Desai
*Assistant Examiner* — Jacob A Smith
(74) *Attorney, Agent, or Firm* — Rankin, Hill & Clark LLP

(57) ABSTRACT

The method relates to a method for filling a container (13, 32) with carbonized liquid filling material and for closing the filled container, in which the filling material is introduced in a filling station (10, 30) by a filling head (11, 33) at defined filling pressure into the container (13, 32), wherein the filling head (11, 33) is firstly moved from an idle position, which permits supplying and inserting a container (13, 32) into the filling station (10, 30), into a working position toward the inserted container, in which an end region (16) of the filling head seals off the opening (14) of the container, the container (13, 32) is then filled, the filling head (11, 33) is moved after completion of the filling phase back out of the working position into an idle position spaced apart from the container (13, 32) and the container (13, 32)
(Continued)

Figure 1:
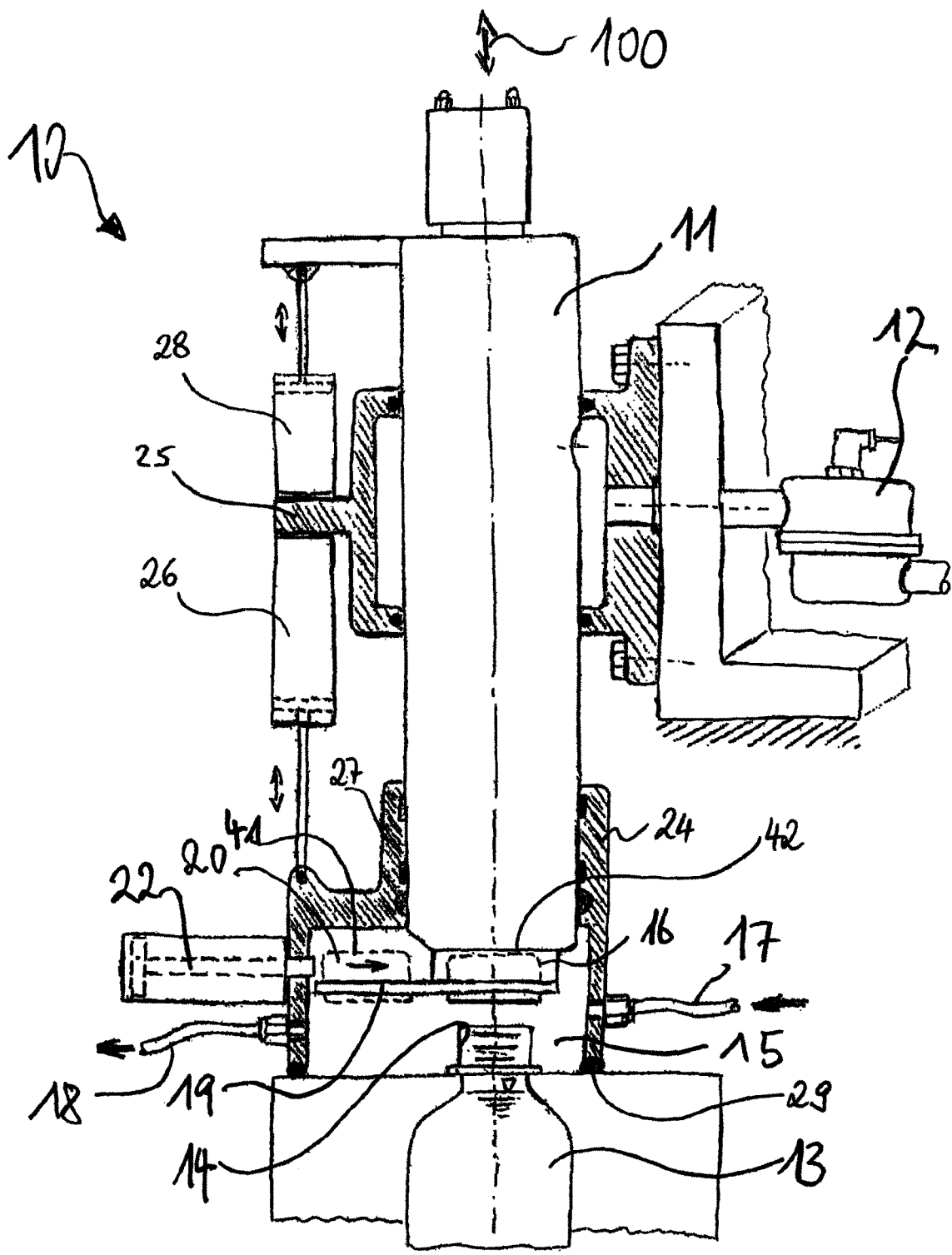

is then closed in the filling station (10, 30) using a cap (20) at least enough that filling material can no longer escape, and the container (13, 32) is then removed from the filling station (11, 33), characterized in that before the movement of the filling head (11, 33) from the working position into the idle position spaced apart from the container (13), an overpressure lying between the ambient pressure and the filling pressure is set in a pressure chamber (15) of the filling station (10, 30) surrounding the opening (14) of the inserted container (13, 32), which overpressure is selected in such a way that possible foaming up of the filling material located in the container (13, 32) is minimized enough that filling material does not escape from the container (13, 32) when the filling head (11, 33) is raised out of the working position after the filling procedure.

14 Claims, 3 Drawing Sheets

(51) Int. Cl.
| | | |
|---|---|---|
| | *B29C 49/46* | (2006.01) |
| | *B29C 49/12* | (2006.01) |
| | *B67C 7/00* | (2006.01) |
| | *B67B 3/20* | (2006.01) |
| | *B67C 3/06* | (2006.01) |
| | *B29L 31/00* | (2006.01) |
| | *B67C 3/22* | (2006.01) |

(52) U.S. Cl.
CPC ............ *B29C 49/46* (2013.01); *B67B 3/2066* (2013.01); *B67C 3/06* (2013.01); *B67C 7/00* (2013.01); *B29C 2049/4664* (2013.01); *B29L 2031/712* (2013.01); *B67C 2003/227* (2013.01); *B67C 2003/2671* (2013.01); *B67C 2003/2691* (2013.01)

(58) Field of Classification Search
CPC .. B29C 49/12; B67C 3/02; B67C 3/16; B67C 3/22; B67C 3/26; B67C 2003/226; B67C 2003/227; B67C 2003/228; B67C 2007/006; B67C 2007/0066; B65B 3/02; B65B 3/022; B67B 3/24; B67B 2201/08
USPC ................................................... 53/453, 574
See application file for complete search history.

(56) References Cited

U.S. PATENT DOCUMENTS

| | | | |
|---|---|---|---|
| 7,914,726 | B2 | 3/2011 | Andison et al. |
| 2005/0199313 | A1* | 9/2005 | Edwards ............ B65D 41/3409 |
| | | | 141/114 |
| 2011/0186757 | A1 | 8/2011 | Kawamura et al. |
| 2012/0266567 | A1 | 10/2012 | Haesendonckx et al. |
| 2013/0307197 | A1 | 11/2013 | Haesendonckx et al. |
| 2014/0174044 | A1 | 6/2014 | Chauvin et al. |
| 2015/0190960 | A1 | 7/2015 | Chauvin et al. |
| 2015/0284234 | A1* | 10/2015 | Meinzinger ............... B67C 3/10 |
| | | | 141/59 |
| 2016/0023785 | A1* | 1/2016 | Clüsserath ................ B65B 3/30 |
| | | | 425/145 |
| 2017/0021553 | A1* | 1/2017 | Kharchenko ............. B65B 3/30 |
| 2017/0217076 | A1* | 8/2017 | Shiokawa ............... B29C 49/06 |

FOREIGN PATENT DOCUMENTS

| | | |
|---|---|---|
| CN | 103922253 A | 7/2014 |
| CN | 107073793 A | 8/2017 |
| DE | 19960860 A1 | 12/2000 |
| DE | 102010007541 A1 | 6/2011 |
| EP | 0521475 A2 | 1/1993 |
| EP | 0965524 A1 | 12/1999 |
| EP | 2937310 A2 | 10/2015 |
| JP | H0398894 A | 4/1991 |
| JP | H0885593 A | 4/1996 |
| JP | H08113291 A | 5/1996 |
| JP | 2011173648 A | 9/2011 |
| JP | 2015521968 A | 8/2015 |
| WO | 2012104019 A1 | 8/2012 |
| WO | 2013020884 A1 | 2/2013 |

* cited by examiner

METHOD AND DEVICE FOR FILLING CONTAINERS WITH CARBONIZED FILLING MATERIAL AND SUBSEQUENTLY CLOSING THE FILLED CONTAINERS

The invention relates to a method according to the preamble of claim 1 and to a device according to the preamble of claim 9.

In typical methods for filling containers at high production speeds, so-called filling stations are used. The filling stations are arranged, for example, on working wheels, which cooperate with suitable devices for supplying empty containers and removing the filled containers. The empty containers are firstly inserted into the filling stations in this case. In the next step, a filling head provided in the filling station sinks into a working position on the opening of the container and seals it off. The filling procedure takes place in this working position, during which the filling material is introduced through the filling head under pressure into the container. After completion of the filling, the filling head is moved into an idle position spaced apart from the container opening. The container can then be removed and transported further, for example, to further processing stations (capper, labeler, etc.).

The invention relates in this case not only to the filling procedure alone, i.e., a procedure in which already finished molded containers are provided with filling material. The invention also simultaneously covers methods and devices in which preforms inserted into external molds are expanded by introduction of the filling material under a forming and filling pressure into the final container contour predetermined by the external mold. In this case, the filling material is additionally used as a hydraulic pressure medium. The introduction of the filling material into the preform typically takes place at pressures between 10 and 40 bar, in general at 20 bar, which are significantly greater than the other typically provided filling pressures when finished molded containers are filled. The simultaneous forming and filling of containers made of preforms takes place in so-called forming and filling machines. One significant advantage of these methods and devices is that only one machine is still required. However, it has an increased level of complexity. Examples of such machines are shown in U.S. Pat. No. 7,914,726 B2 and DE 10 2010 007 541 A1.

One problem in known filling or forming-filling methods and/or in devices used for this purpose is that after ending the filling procedure, in the phase between the movement of the filling head into a position spaced apart from the container opening up to the closing of the opening, unintentional escape of the filling material from the container can occur.

This can be attributed to the fact, for example, that a filled container experiences abrupt direction changes during the transport to a capping station, which result in spillage of the filling material. In particular during the filling of fully carbonated or partially carbonated beverages, due to the depressurization of the filling pressure to the ambient pressure occurring when the filling head is raised, undesired, sometimes massive foaming can occur, which can in turn result in liquid loss and undesired soiling of the container and/or the filling station. This is a problem in particular at the above-mentioned high forming and filling pressures.

The filling material losses induced by possible direction changes may be avoided in that the container is closed immediately after its filling while still in the filling or forming and filling station. This is already known, for example, from DE 10 2010 007 541 A1 and from WO 2002/104019 A1. Capping devices are generally provided for this purpose, which are arranged either coaxially and rotationally movable in relation to the filling head or the filling head is held together with the capping device in a tool carrier and alternately positioned in a working arrangement or an idle arrangement. The capping device screws a screw closure cap onto the filled container in both known variants.

With regard to problems which occur in particular during the filling of carbonized filling material in filling stations upon depressurization of the container interior from the filling pressure, generic EP 2 937 310 A2 furthermore provides that an overpressure is set in a region surrounding the opening of a filled container in a filling station before the removal of the filling head from the container opening. This surrounding region is formed by a pressure chamber. The overpressure in the pressure chamber is selected so that the filling material located in the container does not foam up or only foams up to a limited extent and does not escape from the container when the filling head is disengaged from the container opening. It is disadvantageous that the filling head is moved from the side into the pressure chamber, which requires a relatively high constructive expenditure.

The object of the invention is therefore to provide a device and a method in which the disadvantages of the prior art are overcome.

This object is achieved by a method having the features of claim 1 and by a device having the features of claim 9, respectively.

Further advantageous designs are specified in the dependent claims.

It is accordingly provided according to the invention that the filling head is located above the container opening in the idle position and is moved from there in the axial direction into the working position.

As in the prior art, it is furthermore provided that an overpressure is set in a region surrounding the opening of a filled container in a filling station before the raising of the filling head off of the container opening. This surrounding region is formed by a pressure chamber. The overpressure in the pressure chamber is selected so that the filling material located in the container does not foam up or only foams up to a limited extent and does not escape from the container when the filling head is raised off. Closing of the container opening can then take place without problems while still in the filling station. After the closing, the filling station can be depressurized from the set overpressure to ambient pressure. In a certain way, the pressure chamber represents the provision of an intermediate pressure level between ambient pressure and filling pressure or forming and filling pressure.

In a structural aspect, the pressure chamber has to be able to accommodate and surround in a sealed-off manner the container opening, the container-side end of the filling head, and a closure cap in a sealed manner so that raising of the filling head off of the container and closing of the container using a closure cap can be performed without significant collapse of the pressure level.

It is thus ensured that the risk of soiling between raising of the filling head and closing of the container opening is minimized. As already mentioned above, the solution according to the invention is advantageous in particular if, according to one preferred design of the invention, the containers to be filled are so-called preforms, which are first formed into the finished containers during the filling procedure. Such preforms consist of a thermoplastic material, wherein the preform is firstly thermally conditioned before its forming and is subsequently formed into the container inside a mold using the filling material as a pressure medium. This is performed in a so-called forming and filling station, i.e., a station which also assumes the forming of the container in addition to the filling. The forming and filling procedure essentially takes place like a filling procedure, but with the difference that the filling medium is introduced into the preform at higher pressures than filling procedures alone, for example, between 10 and 40 bar, and possibly a stretching rod extending axially movably through the forming and filling head is provided in the forming and filling station, which is introduced into the preform and stretches it in its axial direction. When reference is made hereafter to filling heads and/or stations and to filling, these designations are generally also to include forming and filling devices and/or forming and filling methods.

The overpressure set in the region of the filling station surrounding the container opening, namely in the pressure chamber, preferably corresponds approximately or at least to the saturation pressure of the $CO_2$ located in the container. At typical carbonizations of 5-9 g/l $CO_2$ (nonalcoholic soft drinks), the saturation pressure is, for example, between approximately 4-10 bar, in general at values of approximately 5 bar.

It can preferably be provided that the container internal pressure is firstly lowered to the surrounding overpressure in the pressure chamber, for example, via a pressure equalization line, before the raising of the filling head. This pressure equalization line connects the pressure chamber through the filling head to the container interior, for example, with the filling head located in the working position. The pressure equalization line can be controlled, for example, by a controllable valve. It is also possible that the pressure equalization line is released by the stretching rod when it is retracted into an idle position after completion of the forming and filling procedure. Due to such a pressure equalization line, it is possible to prevent a sudden depressurization to the overpressure set in the pressure chamber from occurring upon raising of the filling head.

Furthermore, the overpressure in the pressure chamber of the filling station is preferably set in a $CO_2$ atmosphere. However, using another gas, for example, air, nitrogen, oxygen, H2O2, protective gases, inert gases such as helium or argon, or nitrous oxide is also conceivable.

It is furthermore preferably provided that the container is closed using a screw closure cap. This can be screwed onto the container, for example, using a suitable capping device in the pressure chamber of the filling station.

However, the cap is particularly preferably firstly pressed onto the opening in the container longitudinal direction up into at least one first sealing position in the filling station without a screwing movement and the final screwing on, if still required, is performed later, for example, after removal of the container from the filling station. The filling head can assume the pressing on in this case by the execution of a pressing-on stroke movement.

The last-mentioned design is advantageous in particular because it can be performed in a simple manner by pressing on the screw closure cap using the filling head, without complex constructive modifications to the filling head or in the filling station being required for this purpose.

A depressurization of the pressure chamber to ambient pressure preferably first takes place when a closure cap has been screwed onto the container.

The invention furthermore also relates to a device, using which the method can be carried out.

The filling station according to the invention comprises a region into which a container can be inserted so that its opening is aligned flush with an axially movable filling head. The filling head may be displaced between a working position, in which it is applied to the container opening to form a seal, and, for example, an idle position, in which it is positioned above and spaced apart from the opening. The filling head is capable in a known manner of introducing a filling material having previously set filling pressure into the container in the working position.

As in the prior art, it is provided that a chamber surrounding the opening of the container and the container-side end of the filling head is formed in the filling station, in which an overpressure may be set. This pressure chamber forms, for example, a pressure cavity or pressure bell provided in this region, which accommodates the container opening, the container-side end of the filling head, and a closure cap in a sealed manner and encloses them in a sealed manner so that raising of the filling head off of the container and closing of the container using a closure cap can be performed without significant collapse of the pressure level. The pressure chamber can comprise feed lines and discharge lines via which (for example, controlled by a valve), the desired overpressure may be set in a desired atmosphere, for example, $CO_2$ or the further above-mentioned gases.

Furthermore, a holding unit is provided in the pressure chamber of the filling station, in which a cap can be arranged in a waiting position so that it does not interfere during the filling procedure. This arrangement of the closure cap in the holding unit can take place, for example, simultaneously with the insertion of a container into the filling station. The supply of the closure caps into the waiting position of the holding unit can be performed in principle using arbitrary handling means, which are also known in container or preform handling, for example, using tongs, or using other cap supply units from the prior art.

After the filling procedure and after the movement of the filling head away by raising into a position spaced apart from the container, the closure cap can then be moved by the holding unit or by a positioning unit for the closure cap from the waiting position into a position between filling head and container opening and then subsequently, for example, pressed or screwed onto the opening in the pressure chamber.

It is preferably provided that the cap is pressed using the filling head onto the opening in the container longitudinal direction. This pressing on of the closure cap can take place, for example, up to a first sealing position, which initially solely ensures that filling material losses do not occur upon handling of the container during the removal from the working wheel or upon the depressurization from the set overpressure in the pressure chamber to the ambient pressure. It can be provided that in a later closing step, for example, outside the filling station, the cap is firstly brought into its final closed position.

However, it is also possible that the closure cap, for example, a screw closure cap, is already brought into its final closed position in the pressure chamber of the filling station, for example, in that it is completely pressed and/or screwed onto the container until reaching the final closed position. It is obvious that the device according to the invention comprises the required control equipment so that the filling head assumes the various positions in the described manner and can execute the described movements and/or executes them in a controlled manner.

An extremely compact construction is assisted in that the containers in the described methods and devices are formed, filled, and closed on a rotating working wheel. This working wheel revolves continuously in the production mode.

In contrast to a filling station alone, a forming and filling station can also comprise a stretching rod, which is accommodated axially displaceably in the filling head. Otherwise, the basic constructive principles of a forming and filling station are similar to those of a filling station, however.

It is fundamentally to be noted that it is only possible using the filling head movably aligned with the container according to the invention to provide both a filling station alone and also a forming and filling station. A generic station as described in EP 2 937 310 A2, in contrast, may not be refined to form a forming and filling station, since the stretching rod typically extending through the filling head is not capable of permitting a lateral insertion of the filling head into the station.

Figure 2:
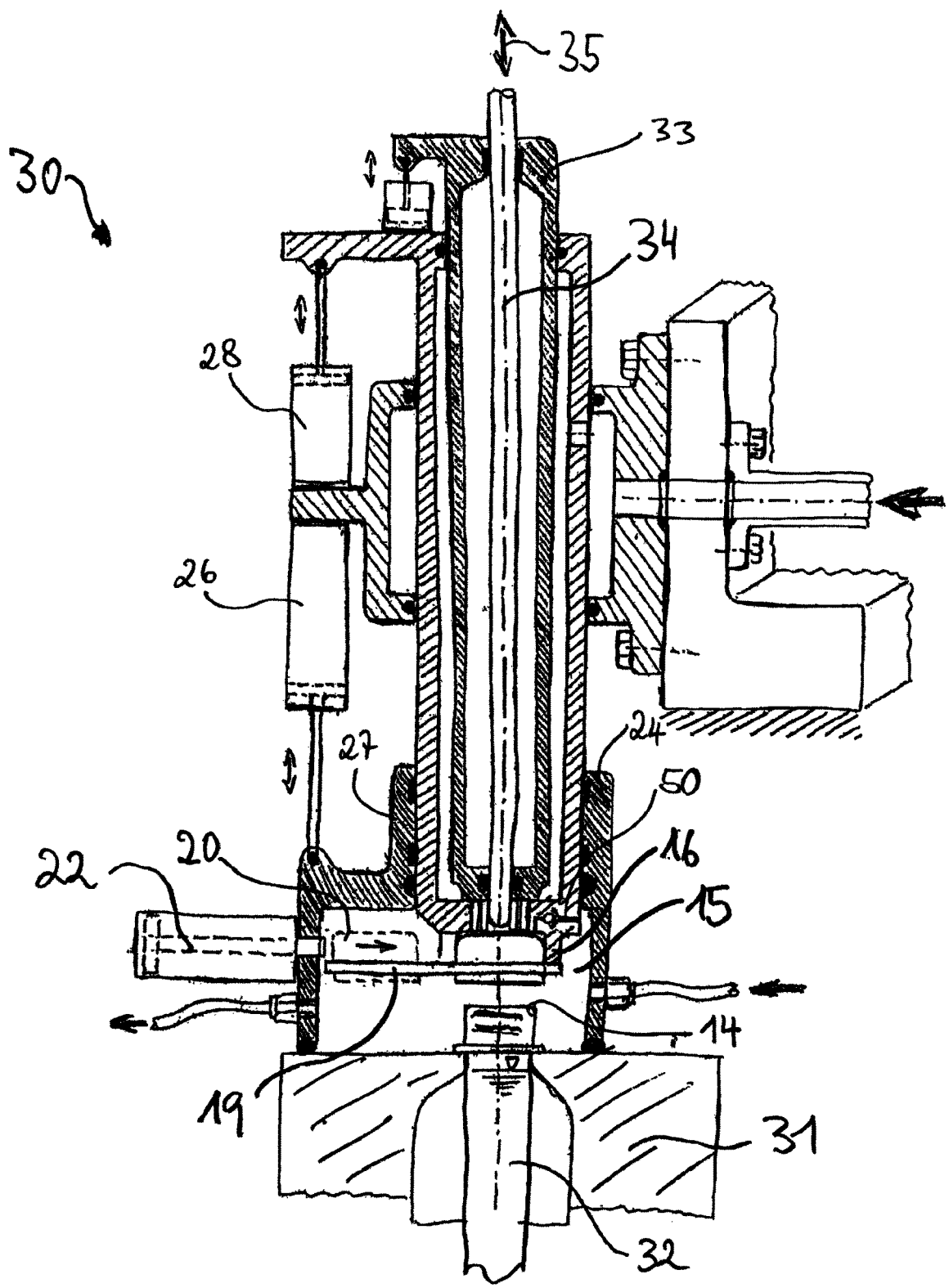
Figure 3:
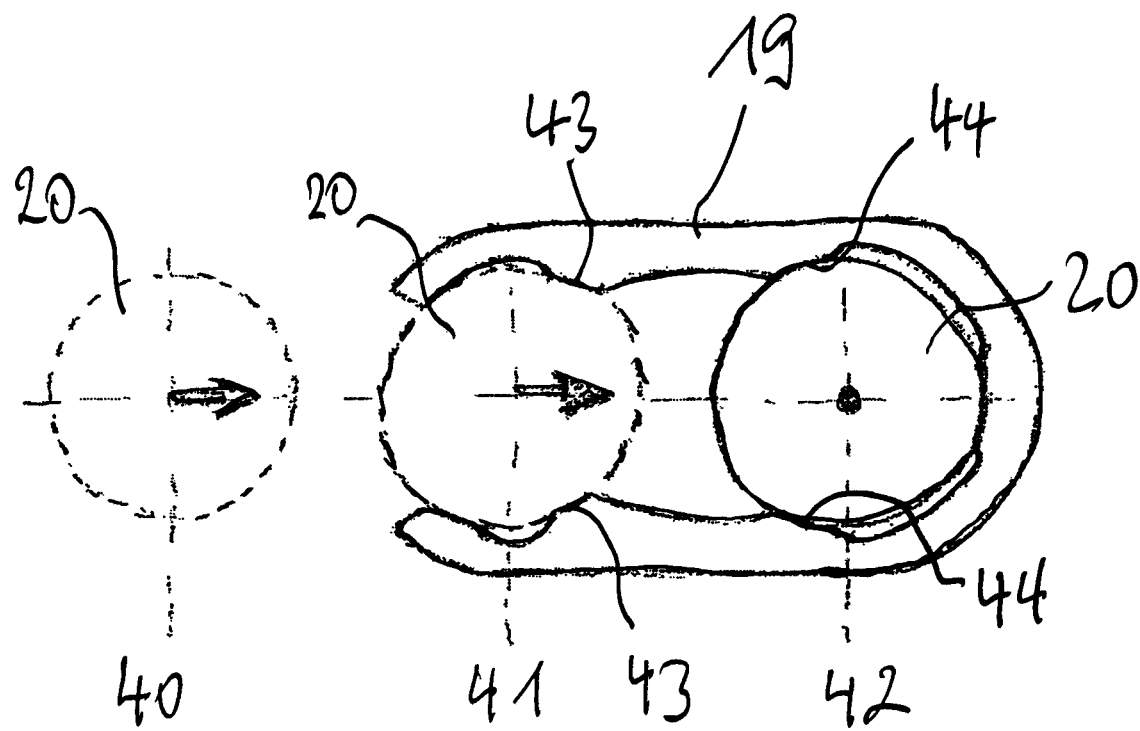

The invention is to be explained in greater detail hereafter on the basis of several figures. In the figures:

FIG. 1 shows an embodiment of the device according to the invention as a filling station, FIG. 2 shows an embodiment of the device according to the invention as a forming and filling station, FIG. 3 shows an illustration of a suitable rail, in which the closure cap may be displaced.

The fundamental construction of a machine for filling containers and/or for simultaneously forming and filling containers made of preforms is well known from the prior art. To avoid repetitions, reference is made with respect to a forming and filling station to DE 10 2010 007 541 A1, in particular to paragraphs [0028] to [0065] therein and to FIGS. 1 to 8 therein. Only the special features relevant for the present invention are described in this regard hereafter.

FIG. 1 shows a schematic view of a filling station 10 having a filling head 11 arranged displaceably in the axial direction, to which the filling material to be filled can be applied via a feed line 12. Furthermore, a container 13, which is arranged in its filling position, is shown. The container opening 14 aligned on the filling head side is located inside a pressure chamber 15. The pressure chamber 15 surrounds both the container opening 14 and also an end 16 of the filling head 11 facing toward the container 13. This end 16 of the filling head 11 is designed so that upon lowering of the filling head 11, it comes into sealing contact with the opening 14 of the container, whereupon the filling can then be performed.

The pressure chamber 15 is formed by a bell-type chamber body 24, which is arranged vertically movably in relation to a carrier element 25 of the filling machine. The vertical mobility is schematically indicated by the illustrated hydraulic cylinder 26. The filling head 11 penetrates the chamber body wall 27 facing away from the container in a sealed and axially displaceable manner, i.e., in the direction of the arrow 100. The filling head is also vertically movable in relation to the carrier element 25 in the schematically indicated manner, indicated by a further actuator 28. On its container-side lower side, the chamber body 24 comprises a circumferential seal 29. In the sealing position shown of the chamber body 24, this seal 29 is applied to form a seal. The chamber body 24 can be raised via the hydraulic cylinder or actuator 26 to enable a removal of the filled container 13, an insertion of an empty container, and the tracking of a closure cap 20.

A desired overpressure can be set using a suitable gas in the pressure chamber 15 via a feed line 17 and a discharge line 18. Furthermore, a holding unit formed as a rail 19 is apparent in the pressure chamber 15, in which a closure cap 20 is accommodated in a waiting position 41. By means of a loading finger 22, the closure cap 20 can be displaced from the waiting position 41 shown into a position 42 between the end 16 of the filling head 11 and the container opening 14. The cap 20 can then be pressed onto the opening 14 using the end 16 of the filling head 11 by a corresponding lowering movement of the filling head 11.

The supply of closure caps, for example, of screw closure caps, into the waiting position 41 of the holding unit is performed by a cap supply unit (not shown). In this case, this can be, for example, a supply rail in which the caps are supplied to the filling station by sliding.

FIG. 2 shows a filling station, which is designed as a forming and filling station. This forming and filling station 30 substantially corresponds to the filling station 10 shown in FIG. 1. Corresponding components are therefore identified with identical reference signs as in FIG. 1.

In contrast to FIG. 1, in the forming and filling station 30 illustrated in FIG. 2, finished containers are not filled, but rather a preform 32 inserted into an external mold 31. As already stated at the outset, the preform 32 has been thermally conditioned beforehand in such a way that upon introduction of a filling medium at corresponding pressure, it can be expanded in the mold 31 into the final container form. To assist this process, the forming and filling station comprises a forming and filling head 33, in which a stretching rod 34 is provided, which can be displaced in the direction of the arrow 35. During the forming and filling procedure, the stretching rod 34 is lowered into the preform 32 and stretches it in the longitudinal direction. After completion of the forming and filling procedure, the stretching rod 34 is retracted into the filling head 33 and then preferably releases a pressure equalization valve (not shown), via which the internal pressure prevailing in the now formed container 13 is depressurized to an overpressure prevailing in a surrounding pressure chamber 15.

In the illustrated exemplary embodiment, the chamber body 24 is again shown in its sealing position and the seal 29 presses against the mold 31 to form a seal.

FIG. 3 shows a holding unit formed as a rail 19, as can similarly be used in the filling station shown in FIG. 1, but also in the forming and filling station shown in FIG. 2, for accommodating and displacing a cap 20 in the pressure chamber 15. Via a cap supply unit (not shown), the cap 20 is transferred before beginning the filling procedure from a transfer position 40 to the rail 19 and arranged therein in a waiting position 41 predetermined by clamping cams 43. The desired overpressure atmosphere is then set in the pressure chamber 15 via the lines 17 and 18 (after assuming the sealing position of the chamber body) and the filling procedure can be carried out. After completion of the filling procedure, the filling head 11 or 33, respectively, is disengaged from the opening 14 of the container 13 again. Subsequently, using the loading finger 22 shown in FIGS. 1 and 2, the closure cap 20 is moved into a pressing-on position 42 defined by cams 44 between the opening 14 of the container 13, 32 and the free end 16 of the filling head 11, 33. The filling head 11, 33 is then lowered and presses the cap 20 onto the opening 14. The filling and the closing of containers in forming and filling stations is performed similarly.

The invention claimed is:

1. A method for simultaneously forming and filling a container having an opening with a carbonated liquid filling material in a device having at least one filling station that includes a filling head and for closing the opening of the container after the container has been filled with the carbonated liquid filing material, the method comprising steps of:

inserting a preform into a mold in the filling station such that, after insertion of the preform, the filling head is axially aligned above an opening of the preform and the filling head is spaced apart from the preform;

after the inserting step, moving the filling head axially toward the inserted preform to a working position in which an end region of the filling head seals off the opening of the preform;

filling the preform in the filling station by introducing the carbonated liquid filing material into the preform through the filling head in the working position at a defined pressure such that the preform is simultaneously filled and expanded by the introduced carbonated liquid filling material and the container is formed to have a contour predetermined by the mold;

during the filling step, lowering a stretching rod from the filling head into the preform and stretching the preform in a longitudinal direction;

after completion of the filling step, retracting the stretching rod into the filling head and moving the filling head out of the working position such that the filling head is axially spaced apart from the container;

closing the container in the filling station using a closure cap such that carbonated liquid filling material cannot escape from the container; and removing the filled and capped container from the filling station;

wherein, before moving the filling head out of the working position, an overpressure is set in a pressure chamber of the filling station surrounding the opening of the container, wherein the overpressure is a pressure between ambient pressure and the defined filling pressure at which foaming up of the carbonated liquid filling material introduced in the container is minimized enough that the carbonated liquid filling material does not escape from the container when the filling head is moved out of the working position and the closing step is performed, and wherein, to close the container, the closure cap, which is arranged in the pressure chamber of the filling station surrounding the opening of the container, is pressed onto the opening of the container by the filling head at least up into a first sealing position.

2. The method as claimed in claim 1, wherein, before moving the filling head out of the working position after the filling step, the filled container is first depressurized from the defined filling pressure to the overpressure set in the surrounding pressure chamber of the filling station.

3. The method as claimed in claim 1, wherein the overpressure set in the pressure chamber is between 4-10 bar.

4. The method as claimed in claim 1, wherein the closure cap is a screw closure cap.

5. The method as claimed in claim 1, wherein the pressing on of the closure cap by the filling head is performed by an axial pressing-on stroke movement of the filling head.

6. The method as claimed in claim 1, wherein the overpressure in the surrounding pressure chamber of the filling station is set in a $CO_2$ atmosphere.

7. The method as claimed in claim 1, wherein the overpressure set in the surrounding pressure chamber of the filling station is only depressurized to ambient pressure after the closure cap has been pressed onto the container opening.

8. A device for simultaneously forming and filling a container having an opening with a carbonated liquid filling material and for closing the opening of the container after the container has been filled with the carbonated liquid filling material, the device comprising:

at least one filling station that includes
a mold for receiving a thermally conditioned preform, said mold predetermining a final contour of the container, and
a filling head for introducing the carbonated liquid filling material into the preform under pressure and thereby forming the container and filling the container with the carbonated liquid filling material, said filling head including an axially displaceable stretching rod for axially stretching and guiding the preform during forming and filling; and
a capping unit for closing the opening of the container using a closure cap, said capping unit including a cap holder;

wherein a pressure chamber is provided in the filling station to surround the opening of the container, an end of the filling head facing toward the opening in the container and the cap holder having a cap arranged thereon in an externally sealed manner, wherein the filling head is accommodated in the station such that the filling head is axially movably relative to the opening in the container between an idle position in which the end of the filling head is spaced above the container opening and a working position in which the end of the filling head seals off the opening of the container, and wherein the filling head is configured to press the closure cap, which is arranged in the pressure chamber of the filling station surrounding the opening of the container, onto the opening of the container, at least up to a first sealing position, to close the container.

9. The device as claimed in claim 8, wherein the closure cap is a screw closure cap, and wherein the filling head is configured to at least partially press the closure cap onto the container.

10. The device as claimed in claim 8, wherein the cap holder provided in the pressure chamber is configured such that the closure cap is arranged in a waiting position before the container is filled, and the cap holder permits a displacement of the closure cap from the waiting position into a position between the container-facing end of the filling head and the opening of the container.

11. The device as claimed in claim 8, wherein the pressure chamber is connected to a feed line for a gas.

12. The device as claimed in claim 11, wherein the gas is $CO_2$.

13. The device as claimed in claim 8, wherein the filling head comprises a pressure equalization line between the pressure chamber and an interior of the container.

14. The device as claimed in claim 13, wherein the pressure equalization line is controlled by a controllable valve.

* * * * *